Patented Jan. 26, 1943

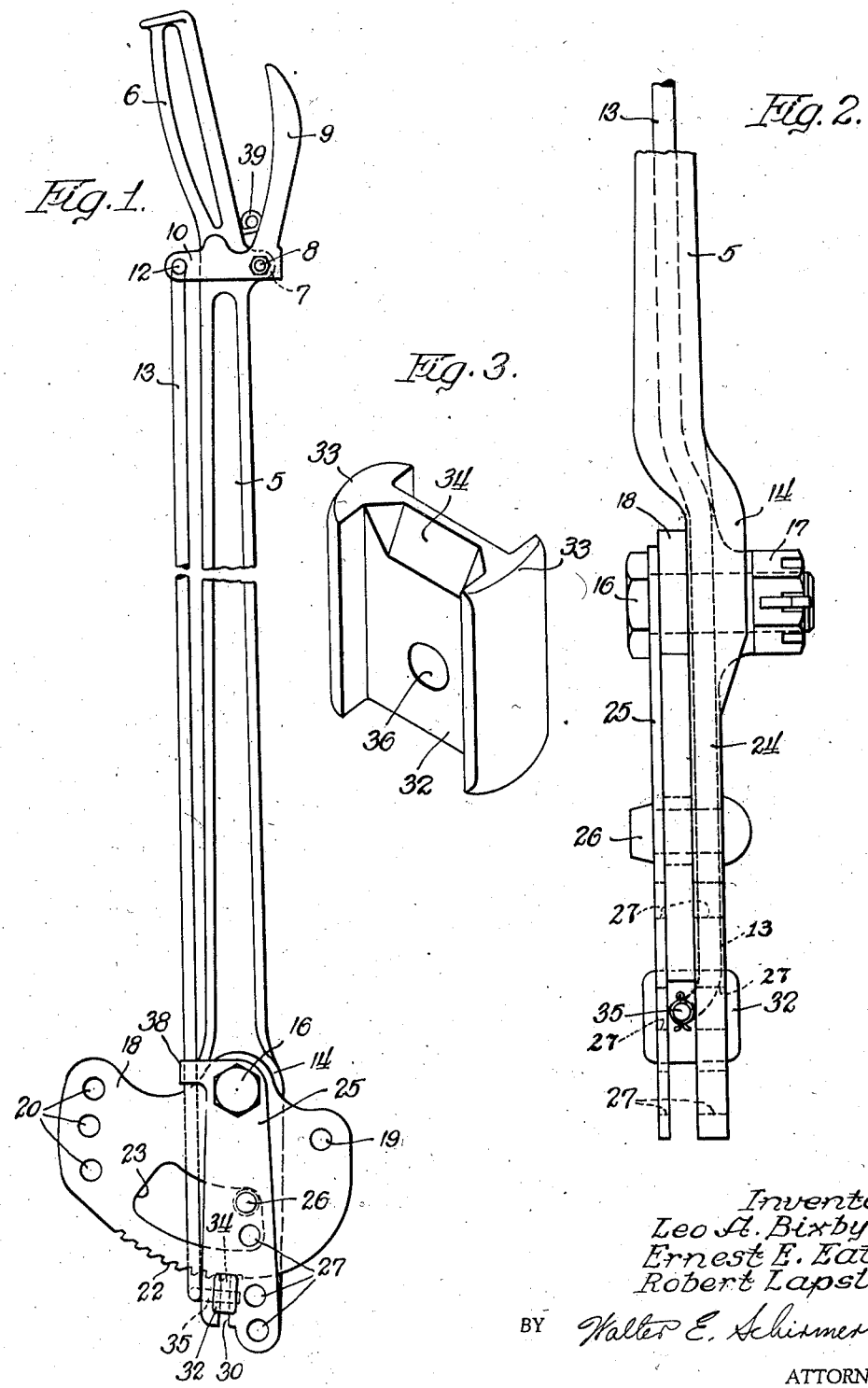

2,309,160

UNITED STATES PATENT OFFICE 2,309,160

BRAKE LEVER

Leo A. Bixby, Niles, and Ernest E. Eaton and Robert Lapsley, Berrien Springs, Mich., assignors to Clark Equipment Company, Buchanan, Mich., a corporation of Michigan Application October 12, 1940, Serial No. 360,884

9 Claims. (Cl. 74—538)

This invention relates to brake levers, and more particularly is directed to a hand brake lever assembly for use in automotive vehicles as a means for applying the service brake or parking brake.

One of the primary objects of the present invention is to provide a brake lever construction which will be considerably less expensive than those heretofore required, and may be formed from a simple forging rather than from sheet material which is rolled up to form a tubular lever arm.

Another feature of the present invention is to incorporate in the structure means whereby the entire transverse area of the pawl or ratchet tooth surface is engageable by the detent mechanism whereby a positive locking of the brake in any of its selected positions is effected.

In this connection, we preferably provide a pawl or detent of generally H-shaped section which may be formed of cold rolled steel or the like, and which is so arranged as to have lateral support in the slotted end of the brake lever, the web portion of the pawl engaging transversely across the rack or sector teeth while the flange portions support the pawl against any twisting or cocking movements with respect to the lever.

Still another advantage secured by the present invention is the provision of a lever construction in which provision is made in the sector and the brake lever allowing the same to be installed on various types of transmissions, and to provide for various throws or arcs of movement of the lever in connection with the brake applying and releasing action. It is to be understood, of course, that the maximum amount of movement of the lever is defined by the arcuate path between the instrument cowling or dashboard and the seat cushion, and the construction has been arranged so that the desired amount of brake applying force can be transmitted within this range of movement.

In its preferred form, the present invention comprises a brake lever arm which consists of a forging having an offset lower end portion in which is mounted a pivot pin for pivoting the lever on the sector. Secured on the opposite side of the sector is a plate or the like formed from a stamping and adapted to be alined for conjoint movement with the offset portion of the lever about the pivot. This plate is preferably provided with means forming a guide for the pawl actuating rod to prevent it bowing out away from the lever during the application of pressure thereto.

Other objects and advantages of the present invention, such as simplicity of design and assembly features, will be more apparent from the following detailed description, which, taken in conjunction with the accompanying drawing, will disclose to those skilled in the art the particular construction and operation of a preferred form of the present invention.

In the drawing:

Figure 1 is an elevational view of a brake lever embodying the present invention;

Figure 2 is a side view of the lever shown in Figure 1; and

Figure 3 is a detail perspective view of the actuating pawl.

Considering now the drawing in detail, the brake lever comprises a main body portion 5 which is formed as a forging having at its upper end the hand grip portion 6 provided with an offset shoulder 7 adapted to form a journal for the pivot pin 8 by which the pawl actuating lever 9 is pivoted adjacent the handle. The lever 9 consists of a bell crank having its opposite arm 10 formed as a bifurcated member extending about the sides of the lever 5 and adapted to receive the end 12 of a pawl actuating rod 13.

The lever 5 gradually increases in thickness toward its lower end, and is provided with an enlarged laterally offset boss portion 14, the offset being clearly shown in Figure 2, adapted to receive the stud 16, this stud or pin having the nut 17 threaded thereon to form a pivot journal for mounting the lever 5 about the sector 18. The sector 18 is provided with an aperture 19 and with a plurality of spaced apertures 20 on the opposite side thereof. The aperture 19 and the apertures 20 provide for optional mounting of the sector about the side of a transmission case accommodating the sector to various sizes and designs of transmissions, and also controlling to some extent the arc of movement of the brake lever.

The sector 18 is provided on its lower periphery with the rack 22 composed of a plurality of ratchet-like teeth formed in an arc having the axis of the pin 16 as a center. Intermediate the pin and the teeth 22, the sector is provided with an arcuate opening 23 which extends beyond the arcuate length of the teeth 22.

Mounted on the pin 16 on the opposite side of the sector 18 from the depending portion 24 of the offset end of the lever is a plate member 25, which plate member is provided with a suitable rivet 26, riveting the same for conjoint movement with the depending portion 24 of the lever whereby the lever, in effect, is bifurcated to swing about the sector 18. The rivet 26 is disposed within the slot 23 whereby it has free movement throughout the range of movement of the lever.

Disposed below the rivet 26 the depending portions of the lever and of the plate 25 are provided with alined vertically spaced apertures 27 to which may be connected the motion transmitting rod which extends between the lower end of the lever and the brake actuating cam. This provides for adjustment to determine the rate of movement of the rod, and consequently the rate of movement of the brake cam per unit movement of the brake lever.

The lower end of the plate 25 and of the offset portion 24 of the lever are provided with longitudinal slotted portions 30, which slotted portions are transversely alined and extend radially relative the axis of the pin 16. Disposed within the slots and guided for longitudinal movement therein is a pawl or detent member 32, shown more in detail in Figure 3.

This pawl or detent member 32 is of generally H section with the flanges 33 thereof bearing against the defining external surfaces of the slots 30, holding the pawl against any cocking movement within the slots and forming adequate bearing for the pawl during its longitudinal movement within the slots.

The inner end of the detent member 32 has the flange portion thereof beveled, as indicated at 34, to form a sharp tooth-like member adapted to engage in the respective spaces between the teeth of the rack 22. This provides a bearing across the entire transverse surface of the rack and insures that positive locking of the brake lever with respect to the sector can be effected insofar as the counterclockwise rotation of the lever is concerned. The bevel portion 34 of the detent 32 is so arranged as to be alined with the back bevel surface of the teeth of the rack 22 to accommodate ratching of the lever in a brake applying direction but restraining the lever against movement in a brake releasing direction unless the pawl is moved longitudinally outwardly in the slots 30 to release this toothed engagement.

The pawl is adapted to be actuated by a normally extending end 35 of the pawl actuating rod 13, this rod extending downwardly along one side of the sector and having its end inturned to pass through an opening 36 in the web portion of the pawl. Preferably, a suitable cotter key locks the rod against withdrawal from the pawl. In order to prevent outward bowing of the rod 13 upon rocking movement of the lever 9 relative the handle portion 6 in order to release the pawl engagement, the plate 25 is provided with an extending tongue portion 38 adjacent the upper end thereof, this tongue portion 38 being bent around to form a guide and support for the rod 13 adjacent the pivot 16 holding the rod against outward bowing to insure longitudinal movement thereof.

In order to secure positive engagement of the pawl, the pawl is spring biased toward engaging position by means of a coil spring member 39 which is biased between the handle portion 6 of the rod and the pivoted lever 9. This spring normally urges the lever 9 in clockwise rotation about the pin 8, thereby placing tension upon the rod 13 to move the pawl 34 into detent locking engagement.

It will therefore be apparent that the present construction provides a very simple form of hand brake lever which is considerably less expensive than those heretofore provided in connection with automotive vehicles, such as trucks, busses and the like. Further, the lever has a positive detent engagement across the entire transverse surface of the rack, insuring positive locking of the lever in any of its selected positions.

We are aware that various changes in details of the structure herein shown and described may be made without in any way departing from the underlying principles of the present invention, and we therefore do not intend to be limited except as defined by the scope and spirit of the appended claims.

We claim:

1. In combination, a hand brake lever assembly comprising a forged hand brake lever having a laterally offset portion adjacent its lower end, a sector adapted to be mounted on a fixed support, pivot means for pivotally mounting the lever intermediate the ends of said offset portion on said sector, a plate member mounted on said pivot means on the opposite side of said sector from said lever and secured for conjoint movement with said lever, slot means in said lever and plate member, and H-shaped pawl means having thickened leg portions and an intermediate web guided for longitudinal movement in said slot means and adapted to have engagement with a rack section formed on said sector, said leg portions preventing lateral movement of said pawl members relative to said slot means.

2. In a hand brake lever assembly, a rack sector having the rack portion at the lower periphery thereof, a hand brake lever having a bifurcated lower end pivotally mounted in the upper part of said rack sector terminating therebelow, slot means formed in the lower end of said bifurcated portion of the lever in radial alinement with the pivotal mounting thereof, an H-section pawl having its flange portion guided in said slot means and having a bevelled upper edge intermediate the edges thereof adapted to be engaged in said rack portion.

3. The combination of claim 2 further characterized in the provision of means on said bifurcated end portion of said lever providing for adjustable connection of a brake actuating rod thereto.

4. The combination of claim 2 further characterized in the provision of a pawl actuating rod extending parallel to said lever and connected at its lower end to said pawl, and means on the bifurcated end of said lever forming a guide for longitudinal movement of said rod.

5. A brake lever assembly comprising a brake lever having a laterally offset end portion, a plate member spaced from and parallelling said end portion, alined slots in said end portion and said plate member, a sector member between said end portion and said plate member having a fixed common pivot for said lever and plate member above said offset portion, an arcuate rack on the lower edge of said sector, and an H-shaped pawl guided for longitudinal movement in said slots having a bevelled edge engageable with said rack transversely between said end portion and said plate member, said pawl having thickened leg portions preventing lateral movement thereof out of said slots.

6. A brake lever assembly including an arcuate sector having an arcuate rack formed on one edge thereof, an aperture in said sector, a pivot pin carried by said sector on the opposite side of said aperture from said rack, a brake lever pivotally mounted intermediate its ends on said pin and having a bifurcated end portion receiving said sector, slots in the end of said bifurcated portion alined radially with said pin, an H-shaped pawl in said slots having a transversely extending intermediate edge portion engageable with said rack, and means at the opposite end of said lever for actuating said pawl.

7. In combination, a sector member having an arcuate rack surface, a lever pivotally mounted on said member having parallel end portions extending along opposite sides of said member and projecting beyond said surface, alined slots in the ends of said end portions, a pawl member guided for longitudinal movement in said slots and having thickened edge portions engaging the lateral surfaces of said end portions about said slots to restrain said pawl member against transverse or cocking movement therein, and means including a motion transmitting rod carried by said lever and engaging said pawl member for moving it in said slots to engage the inner transverse end thereof transversely across the full width of said surface.

8. In a brake lever pivotally mounted intermediate its ends and having a bifurcated end portion receiving an arcuate rack therein, radially inwardly directed alined slots in the end of said end portion, a pawl having a transverse web portion slidable in said slots and engageable at the inner end transversely across said rack, and thickened side edges on said pawl engaging the outer lateral surfaces of said end portion of said lever restraining said pawl against lateral displacement or cocking.

9. The lever of claim 8, including a motion transmitting rod extending parallel to said lever and operable to shift said pawl, and guide means on said lever adjacent its pivot preventing bowing of said rod intermediate its ends.

LEO A. BIXBY.
ERNEST E. EATON.
ROBERT LAPSLEY.